(12) United States Patent  
Hopkins, III

(10) Patent No.: US 8,733,640 B1
(45) Date of Patent: *May 27, 2014

(54) SECURE CARD

(71) Applicant: (USAA) United Services Automobile Association, San Antonio, TX (US)

(72) Inventor: John Chandler Hopkins, III, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/767,766

(22) Filed: Feb. 14, 2013

Related U.S. Application Data

(63) Continuation of application No. 13/294,637, filed on Nov. 11, 2011, now Pat. No. 8,376,225, which is a continuation of application No. 11/740,797, filed on Apr. 26, 2007, now Pat. No. 8,109,436.

(51) Int. Cl.
  *G06K 5/00* (2006.01)
  *G06Q 40/00* (2012.01)
  *G06K 19/00* (2006.01)

(52) U.S. Cl.
  USPC ........................... 235/380; 235/379; 235/487

(58) Field of Classification Search
  CPC ... G06Q 20/354; G06Q 20/34; G06Q 20/341; G06K 19/06187; G06K 19/07749
  USPC ......... 235/380, 375, 379, 487, 492, 493, 382; 705/39, 42, 26, 41, 44
  See application file for complete search history.

(56) References Cited

U.S. PATENT DOCUMENTS

| | | |
|---|---|---|
| 4,636,622 A | 1/1987 | Clark |
| 4,641,239 A | 2/1987 | Takesako |
| 4,731,575 A | 3/1988 | Sloan |
| 5,177,790 A | 1/1993 | Hazard |
| 5,180,902 A | 1/1993 | Schick et al. |
| 5,334,823 A | 8/1994 | Noblett, Jr. et al. |
| 5,585,787 A | 12/1996 | Wallerstein |
| 5,590,038 A | 12/1996 | Pitroda |
| 5,623,552 A | 4/1997 | Lane |
| 5,627,355 A | 5/1997 | Rahman et al. |
| 5,918,909 A | 7/1999 | Fiala et al. |
| 5,984,191 A | 11/1999 | Chapin, Jr. |
| 6,089,451 A | 7/2000 | Krause |
| 6,224,108 B1 | 5/2001 | Klure |
| 6,339,766 B1 | 1/2002 | Gephart |
| 6,345,766 B1 | 2/2002 | Taskett et al. |

(Continued)

OTHER PUBLICATIONS

MasterCard, "Fraud Prevention," 4 pages, 2007.

(Continued)

*Primary Examiner* — Thien T Mai
(74) *Attorney, Agent, or Firm* — Perkins Coie LLP

(57) ABSTRACT

Systems and methods for monetary cards are described. The cards are free from personally identifiable data, e.g., no name or embossment. In an example, the card includes a first number that activates the card and a second number written to the card at activation away from the card manufacturer. This helps prevent theft at the manufacturer. This second account is a bearer account where anyone who knows the account number can withdraw the funds from the account. The account may be funded with either the account number or the authentication number.

20 Claims, 13 Drawing Sheets

(56) References Cited

U.S. PATENT DOCUMENTS

| | | |
|---|---|---|
| 6,386,457 B1 | 5/2002 | Sorie |
| 6,510,983 B2 | 1/2003 | Horowitz et al. |
| 6,764,005 B2 | 7/2004 | Cooper |
| 6,883,717 B1 | 4/2005 | Kelley et al. |
| 6,954,133 B2 | 10/2005 | McGregor et al. |
| 7,063,255 B2 | 6/2006 | Algiene |
| 7,140,550 B2 | 11/2006 | Ramachandran |
| 7,264,155 B2 | 9/2007 | Halbur et al. |
| 7,290,714 B2 | 11/2007 | Halbur et al. |
| 7,421,409 B1 | 9/2008 | Kraemer et al. |
| 7,543,739 B2 | 6/2009 | Brown et al. |
| 7,552,074 B2 | 6/2009 | Bruce et al. |
| 7,584,887 B1 | 9/2009 | Sanchez et al. |
| 7,593,896 B1 | 9/2009 | Flitcroft et al. |
| 7,594,604 B2 | 9/2009 | Haas |
| 7,614,548 B2 | 11/2009 | Schultz et al. |
| 7,784,685 B1* | 8/2010 | Hopkins, III .......... 235/380 |
| 7,909,247 B2 | 3/2011 | Bonalle et al. |
| 7,959,076 B1* | 6/2011 | Hopkins, III .......... 235/380 |
| 2001/0029496 A1 | 10/2001 | Otto et al. |
| 2001/0047330 A1* | 11/2001 | Gephart et al. .......... 705/39 |
| 2002/0022966 A1 | 2/2002 | Horgan |
| 2003/0053609 A1 | 3/2003 | Risafi et al. |
| 2003/0061157 A1 | 3/2003 | Hirka et al. |
| 2003/0061170 A1 | 3/2003 | Uzo |
| 2003/0066879 A1 | 4/2003 | Cummins |
| 2003/0069846 A1 | 4/2003 | Marcon |
| 2003/0197059 A1 | 10/2003 | Tidball et al. |
| 2004/0030660 A1 | 2/2004 | Shatford |
| 2004/0133787 A1 | 7/2004 | Doughty et al. |
| 2004/0158532 A1 | 8/2004 | Breck et al. |
| 2004/0188519 A1 | 9/2004 | Cassone |
| 2004/0210449 A1 | 10/2004 | Breck et al. |
| 2005/0119979 A1 | 6/2005 | Murashita et al. |
| 2005/0133590 A1 | 6/2005 | Rettenmyer et al. |
| 2005/0205663 A1 | 9/2005 | Algiene |
| 2005/0218216 A1 | 10/2005 | Arias |
| 2005/0279827 A1 | 12/2005 | Mascavage et al. |
| 2006/0016879 A1 | 1/2006 | Kean |
| 2006/0027647 A1 | 2/2006 | Deane et al. |
| 2006/0074798 A1 | 4/2006 | Din et al. |
| 2006/0124756 A1 | 6/2006 | Brown |
| 2006/0218096 A1 | 9/2006 | Walker et al. |
| 2006/0249574 A1 | 11/2006 | Brown et al. |
| 2006/0249575 A1 | 11/2006 | Turner et al. |
| 2006/0278696 A1 | 12/2006 | Watson |
| 2006/0283958 A1 | 12/2006 | Osterweil |
| 2006/0287964 A1 | 12/2006 | Brown |
| 2007/0007333 A1 | 1/2007 | Foss et al. |
| 2007/0100754 A1 | 5/2007 | Brown |
| 2007/0108270 A1 | 5/2007 | Bjoraker et al. |
| 2007/0112655 A1 | 5/2007 | Jones |
| 2007/0136211 A1 | 6/2007 | Brown et al. |
| 2007/0198347 A1 | 8/2007 | Muldoon |
| 2007/0241183 A1 | 10/2007 | Brown et al. |
| 2007/0241201 A1 | 10/2007 | Brown et al. |
| 2007/0267502 A1 | 11/2007 | Zellner et al. |
| 2007/0294182 A1 | 12/2007 | Hammad |
| 2007/0299773 A1 | 12/2007 | Soderstrom |
| 2008/0005037 A1 | 1/2008 | Hammad et al. |
| 2008/0017720 A1 | 1/2008 | Kranzley |
| 2008/0029607 A1 | 2/2008 | Mullen |
| 2008/0040271 A1 | 2/2008 | Hammad et al. |
| 2008/0077798 A1 | 3/2008 | Nachtigall |
| 2008/0083827 A1 | 4/2008 | Ho |
| 2008/0110977 A1 | 5/2008 | Bonalle et al. |
| 2008/0169344 A1 | 7/2008 | Huh |
| 2008/0191460 A1 | 8/2008 | Blank |
| 2008/0201265 A1 | 8/2008 | Hewton |
| 2008/0222037 A1 | 9/2008 | Foss et al. |
| 2009/0048971 A1 | 2/2009 | Hathaway et al. |
| 2009/0090771 A1 | 4/2009 | Dean et al. |
| 2009/0159669 A1 | 6/2009 | Mullen et al. |
| 2011/0062239 A1 | 3/2011 | Lau et al. |

OTHER PUBLICATIONS

MasterCard, "Identity Theft," 6 pages, 2007.
MasterCard, "MasterCard® Card Security Features," 1 page, 2007.
MasterCard, "MasterCard® Security Initiatives," 1 page, 2007.
MasterCard, "MasterCard® Security Innovations," 1 page, 2007.
MasterCard, "Prepaid Card Search Results," 3 pages, downloaded Apr. 17, 2007.
MasterCard, "Search for Gift & Prepaid Cards," 3 pages, 2007.
MasterCard, "Security & Credit Basics," 1 page, 2007.
"Reference: Hackerware," 3 pages, no date.

* cited by examiner

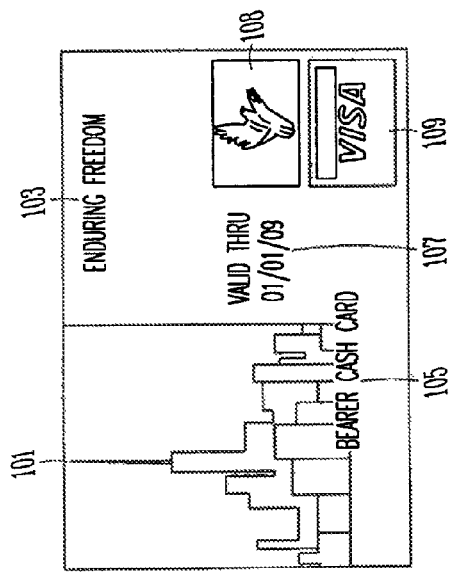

SECURE CARD

CROSS REFERENCES

This application is a continuation of U.S. patent application Ser. No. 13/294,637, filed Nov. 11, 2011, entitled "SECURE CARD," now issued as U.S. Pat. No. 8,376,225, which is a continuation of U.S. patent application Ser. No. 11/740,797, filed Apr. 26, 2007, entitled "SECURE CARD," now issued as U.S. Pat. No. 8,109,436, the entire disclosures of which are herein incorporated by reference for all purposes.

This application is related to U.S. patent application Ser. No. 11/740,773 entitled "SECURE CARD," now issued as U.S. Pat. No. 7,784,685, and U.S. patent application Ser. No. 11/740,787 entitled "SECURE CARD," now issued as U.S. Pat. No. 7,959,076, both filed on Apr. 26, 2007.

TECHNICAL FIELD

Various embodiments described herein relate to monetary value cards, systems and methods.

BACKGROUND

Financial institutions provide credit cards and debit cards to consumers to enable consumers to access credit and/or money on account. However, fraud and theft are problems associated with such cards. In a June 1997 FBI report on credit card fraud, titled *Plastic Payments: Trends In Credit Card Fraud* by Special Agent Keith Slotter, CPA, it states: "Around the world, bank card fraud losses to Visa and MasterCard alone have increased from $110 million in 1980 to an estimated $1.63 billion in 1995. Law enforcement authorities continually confront new and complex schemes involving credit card frauds committed against financial institutions and bank card companies." See http://www.fbi.gov/publications/leb/1997/june971.htm. Financial institutions, such as banks and credit card companies, have a financed numerous efforts to combat fraud. However, such efforts have had limited success. The financial institutions remain locked in an endless dual with the perpetrators of fraudulent activities. To date their efforts seem to be in vain as fraudulent financial transactions are at an all time high and have spread worldwide.

Technology and the information explosion, brought about by the Internet, have spawned new opportunities for criminals that cost the financial institutes and individual victims thousands of dollars to rectify. Identity theft, credit or debit card misuse, fraud and other racketeering schemes cost businesses and individual thousands of dollars in losses. In addition to the money lost to criminals, individuals suffer losses in the form of lost wages and time rectifying the situation and higher interest rates due to credit worthiness issues as a result of the fraud perpetrated in their name.

Individuals are encouraged to help combat the misuse of their financial instruments by carrying fewer credit or debit cards on their person, concealing their card numbers from onlookers at the point of sale, and by monitoring their financial statements to detect foreign or fraudulent transactions. Furthermore, individuals are warned of the perils resultant of identity theft and encouraged to shred documents, financial statements, and anything else bearing personal information that may end up in the hand of those who perpetrate these crimes. However, the deceptive and undetectable nature of identity theft, credit or debit card misuse, and other financial crimes, regularly leave the victim in ruin as the crime is invisible until after the fact, and by then it may be too late.

In addition, the financial institution attempts to thwart fraudulent activities through technology, customer awareness, insurance, and the like. Exemplary examples to provide anti-racketeering and counter espionage efforts employed by financial institutions include safeguards like account PIN numbers, CVV2 numbers on credit cards, and biometrics on the usage side, and detection methods like neural net pattern checking, fraud databases and the like on the investigative side. While all these efforts are helpful the fact remains that financial crimes are at an all time high and show no signs of slowing. Ultimately, at present Americans are left paying for the dichotomy imposed by technology—high tech countermeasures and equally high tech thieves.

A 2006 CNN report indicated that the cost of producing pennies and nickels now surpasses their actual face value. Technology provides reusable media that can be produced cheaply, a fact solidifies technologies role in the future of financial transactions. Hence, what are needed are systems and methods wherein consumers are able to transfer funds securely, from consumer to merchant and from one to another without utilizing cash and without exposing themselves to fraudulent schemes, while keeping the cost of implementation low for the financial institutions.

SUMMARY

Card structures, systems, and methods are described. The cards are free from personally identifiable data, e.g., no name or embossment. In an example, the card includes a first number that activates the card and a second number written to the card at activation away from the card manufacturer. This helps prevent theft at the manufacturer. This second account is a bearer account where anyone who knows the account number can withdraw the funds from the account. The account may be funded with either the account number or the authentication number.

This Summary is an overview of some of the teachings of the present application and not intended to be an exclusive or exhaustive treatment of the present subject matter. Further details about the present subject matter are found in the detailed description and appended claims. Other aspects will be apparent to persons skilled in the art upon reading and understanding the following detailed description and viewing the drawings that form a part thereof, each of which are not to be taken in a limiting sense. The scope of the present invention is defined by the appended claims and their equivalents.

BRIEF DESCRIPTION OF THE DRAWINGS

FIG. 1 shows a front view of a cash card according to an embodiment as described herein.

FIG. 2 shows a rear view of a cash card according to an embodiment as described herein.

FIG. 3 shows a front view of a cash card according to an embodiment as described herein.

FIG. 4 shows a rear view of a cash card according to an embodiment as described herein.

DETAILED DESCRIPTION

Figure 5:
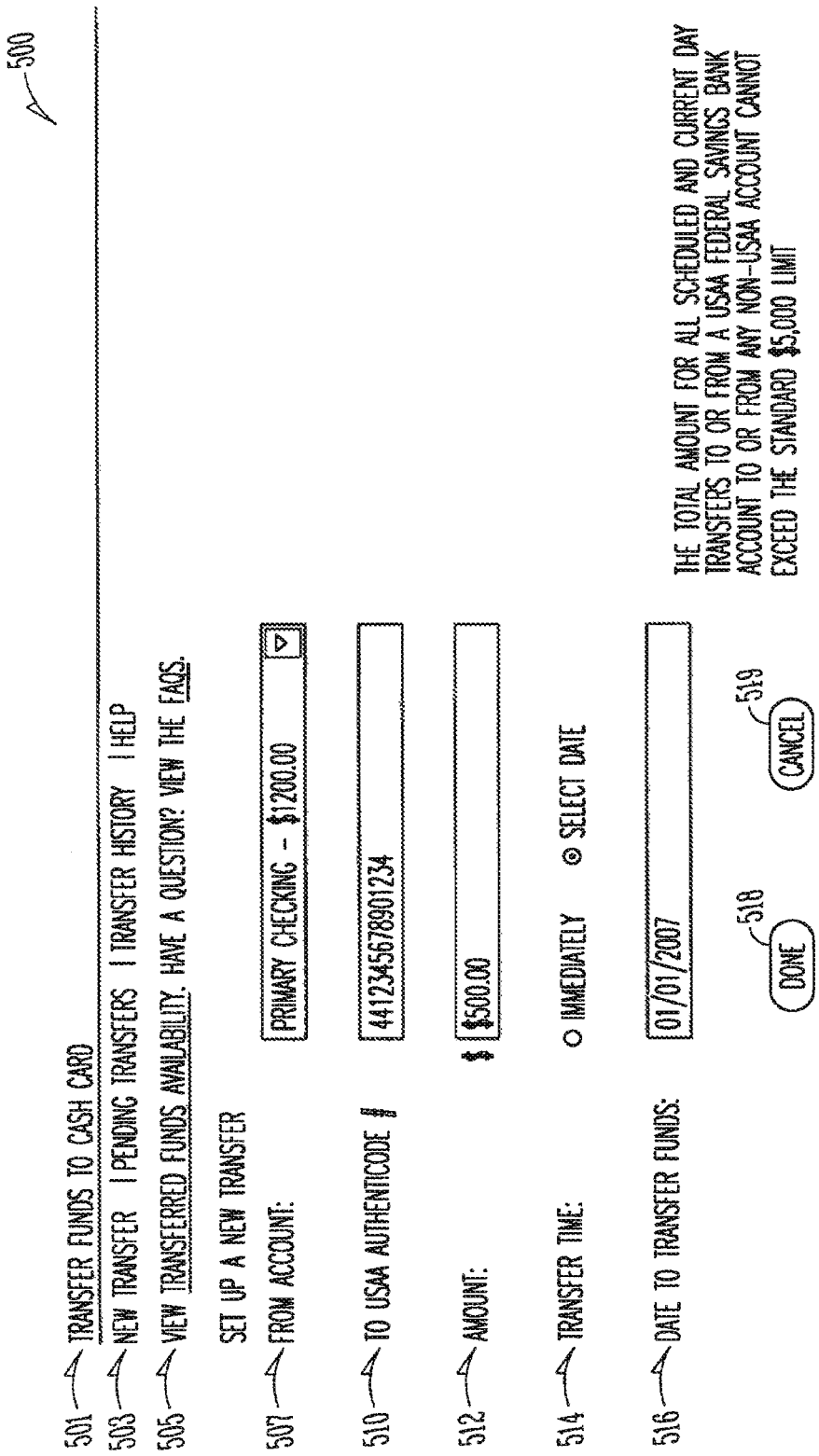
FIG. 5 is a graphical user interface to interact with the card and account according to an embodiment.

FIG. 1 shows a card 100 according to an embodiment and particularly shows a front side of card 100. Card 100 is a support and has a form factor of a commonly accepted credit card, e.g., 3 and ⅜ inches by 2 and ⅛ inches. In an embodiment, the card 100 complies with all ISO\ISE parameters and adherence to ISO 8583 and ANSI X4.16 protocols Card 100 further includes an image section 101 that may represent the financial institution issuing the card or be an image that is appealing to the user. In some instances the image section 101 depicts an image of a city, charity, sports team or other appealing image to the user. This section may encompass all or part of the front side of the card 100. A title 103 further identifies the card 100 to the user. The title 103 may identify the issuing financial institution or the image in image section 101. In the illustrated embodiment, the image section 101 shows the skyline of New York City with the Freedom Tower. The title 103 further identifies the card as an "Enduring Freedom" card. The card further includes an indicia 105 that indicates that the card is a bearer card. The "bearer" nature of this card is discussed in greater detail below. An expiration indicia 107 is shown on the card 100. Card 100 further has an anti-counterfeit device 108, which may be a hologram. Device 108 is used to prevent criminals from counterfeiting a card. A card, such as card 100, typically operates on one or more transaction associations. An indicia 109 shows the association type for this card. The association may be American Express™, Visa™, Mastercard™ Novus™ or Discover™, or other associations for the wide variety of special purpose credit cards such as gas-station credit cards, dining cards, grocery cards.

The card 100 also differs from standard credit cards in that the front side is free from and does not indicate a credit card number. Typical credit cards are embossed with the account number. Some cards are also embossed with the card holders name. With the present card being free from personal identifying information, makes certain types of identity theft or credit card theft difficult. For example, the employees of the manufacturer of the card would find it difficult to see and thus, copy, the account number.

This lack of personal identifying information is different from normal credit or some debit cards in that no record of the owner, or the transactions involving ownership need be stored by the card issuing institution. That said, the personal physically holding this card has a bearer right to the money in the account associated with the card. The card thus becomes a bearer instrument. This is useful for individuals by limiting their exposure to identity theft. As a trade off, the individual may lose the value in the account as there is no personal identifying information to check when the card is used. The event of loss or theft of the card, an individual will lose the amount stored in the account.

FIG. 2 shows a card 200 according to an embodiment and particularly shows a rear side of a card, such as card 100. The card 200 includes an image fixed to the support that is the body of the card. The image is used for marketing purposes to make the card more attractive to particular individuals or provide cross-marketing opportunity with third party companies. Machine readable media 202 is attached to an upper portion of the support substrate of card 200. Media 202 is a magnetic media in an embodiment. In other embodiments, the media may include an optical or other electrical signal storage media that is machine readable. Card 200 further includes a no signature required indicia 204, that further indicates to the user that the card is bearer-type card and that the user need not sign the card 200. It is preferable that the user not sign the card for security. A card number region 206 is provided. In one example, this region is similar to a signatory box of a standard credit card. Region 206 provides a location wherein the an account number can be printed. The card number will be used to authenticate the card and allow a secondary account number to be generated based on approval of the card number as will be explained in greater detail herein. The card number may further include a validation code at the end of the card number. This validation code is not used typically stored electronically and thus requires the physical presence of the credit card to validate the card to prevent theft and fraud based on surreptitious reading of the storage media 202. This account number and validation code are in a small, difficult to read from a distance greater than a few feet font with a non-uniform placement to make it more difficult for onlookers to gain access to cardholder information. Furthermore, unlike current computer-readable media, in the unlawful reproduction of the PAN will not result in access to the funds associated with the card as explained in greater detail herein.

FIGS. 3 and 4 show the front side and rear side, respectively of a card 300 according to an embodiment. Card 300 includes a title 302 indicating the type of card, which is presently illustrated as a identity safe cash card and a issuing financial institution label 304. Card 300 further indicates that the card is a fixed value card at 306. As illustrated the value of the card 300 is ten dollars. However, the present card is not limited to that amount and any fixed amount is within the scope of the present invention. Additional fixed amount indicia may be used on the front or rear of card 300.

FIG. 4 shows the rear of card 300, which includes a machine readable media 402 adjacent the top half of the card. The media 402 is to store data such as account number and other information as needed for use of the card as described herein. In an embodiment, the media is magnetic media. Other storage media is within the scope of the present disclosure. A signature block 406 is provided on the back of the card 300. The signature block 406 is an area on which the card 300 can be permanently written. For example, ink will readily adhere to the block area. In the signature block 406 is a validation number 407. Validation number 407 is not an account number and is used to validate the card. In an embodiment, the card does not have a signature block but include the validation number 407 in a visible location. An institution indicia 408 is provided on the rear side of card 300. A further code 409 is included on card 300. This code 409 is a valid credit card number in an embodiment, which is used to authenticate and activate the card 300. This is not the card number used to draw funds using the card 300. A second account number in which is stored the funds for this card is stored in the media 402. A validation instruction block 410 is printed on the rear side of card 300 and may include, but is not limited to internet address, e.g., URL, and/or a telephone number. Upon activation of card 300 using the validation number 407 and code 409, a second account number is stored in the machine readable media 402. There is no need for personal identifying information to be stored on the card. The card is funded by placing funds in the account associated with code 409. The financial institution will then transfer the funds to the account associated with the account number that is non-visibly, to the human eye, in the media 402. The card can then be used to draw on these funds.

FIG. 5 shows a graphical user interface 500 to fund a card. Interface 500 is displayed on a viewer that connects and allows interaction between user and a computer network. The interface 500 may further be provided at an automated banking machine or at a financial institution. Interface 500 includes an identifying title 501 and a plurality of tabs 503 that allow the user to navigate to other interfaces that interact with an account associated with the card. The tabs 503 represent further interfaces such as a new transfer, which is the displayed interface, pending transfers interface, transfer history interface, and a help interface. Interface 500 further includes a funds availability link 505 that will allow the user to request the balance stored on the account associated with the card. In an embodiment, this link will use the primary account number input by the current user and then request the balance in the second account number, which is the one that actually stores value for the cards. The first account number can be associated with the second number in a lookup table stored in a database of the financial institution. This lookup table will be secure from intrusion by nefarious types. In an embodiment, the lookup table is the only link to the second account that funds the card. Interface 500 includes an input 507 that selects the source of funds to transfer. This input 507 can be pre-filled with the accounts of a user at the institution of the card issuer. A card account number input 510 is provided. This account number is the initial or primary account number. In an embodiment, this number is the authentication number and not the account number from which the card can draw funds. The second account number that funds the card is not displayed on the interface. The financial institution need not display the second account number and user need not know the second account number to fund the card.

Interface 500 further includes fields that control the funding of the card account. An amount input field 512 is provided in which the user selects a dollar amount to fund the card. A select transfer execution time field 514 is provided that allows a user to select immediate execution of the funding or select a date for execution. Another selection for field 514 can be recurring funding at a select date. A date field 516 is provided as needed based on the input of field 514. Cancel and execute (done) inputs 518, 519 are provided at the bottom of the interface 500. The interface 500 allows a user, any user who knows the first account number or authentication code, to fund the second account to fund the card. After funding the card, the money should be considered spent as the card is a bearer instrument and the user will not be able to retrieve the funds without possessing the card, in an embodiment.

Figure 6:
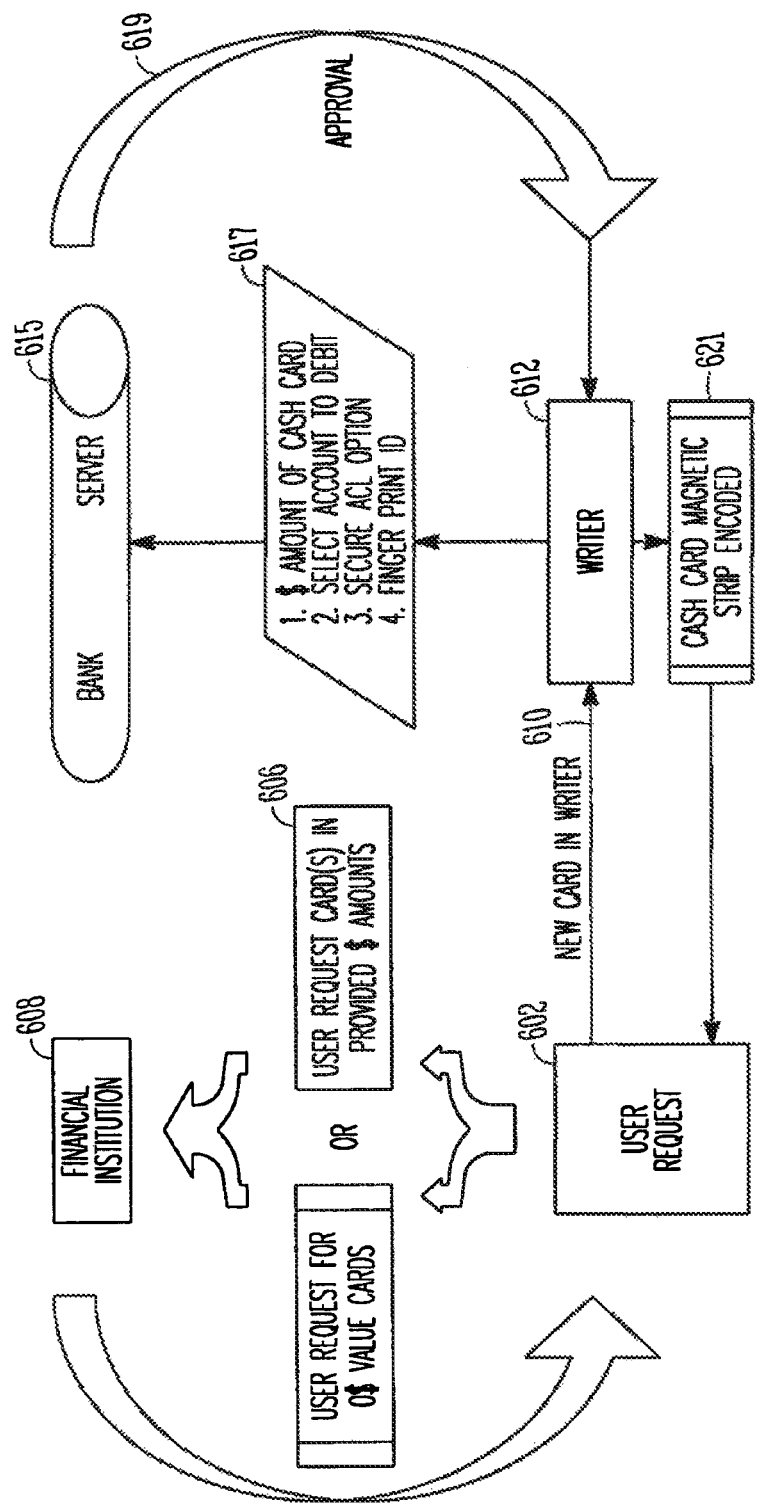
FIG. 6 is a flow chart for using a card according to an embodiment.

FIG. 6 shows a schematic view of card usage 600. A user decides that a secure card would fit their needs and requests a card, 602. The request 602 can be a request for a zero ($0) dollar amount card, 604. The request 602 can request a pre-funded card, 606. The financial institution creates the card at 608, for example, card 100, 200 or 300 as described above. The creation of the card 608 only includes creating the first or primary account number. In the pre-funded embodiment, a transaction to fund the second account number is stored by the financial institution, but the transaction does not occur until the card is activated and the second account number is created. That is, the second account number is not on the card until after it is received by the user. The card is sent to the requesting user.

Once in possession of a user, the card must now be activated. The user can insert the card, 610, in a automated banking machine (ATM), an at-home-automated-banking device, for example, that described in U.S. patent application Ser. No. 11/742,458, titled At Home Automated Banking, inventor John Hopkins, assigned to the present assignee, or other computerized banking device at the financial institution, etc. Each of these devices will include a writer 612 that can write to the card. In an embodiment, the card includes a magnetic strip as the writable media. Accordingly, writers will be able to magnetically write to the strip. The writer will interact with a financial institution or bank server 615. The user through the writer, and possibly through an interface such as interface 500, will request activation of the card. In addition, the amount to fund the card, from what account to fund the card, other security features, and a possible biometric identifier is requested 617. The financial institution then approves, or not, the card, 619. When approved, the bank server 615 creates the second account number and sends the same to the writer 612. The writer then writes the second account number to the card, 621. In an embodiment, the second account number is written to the storage on the card, e.g., the magnetic card strip. The card is now ready for use by the user and is funded in the second account number only, in an embodiment.

Figure 7:
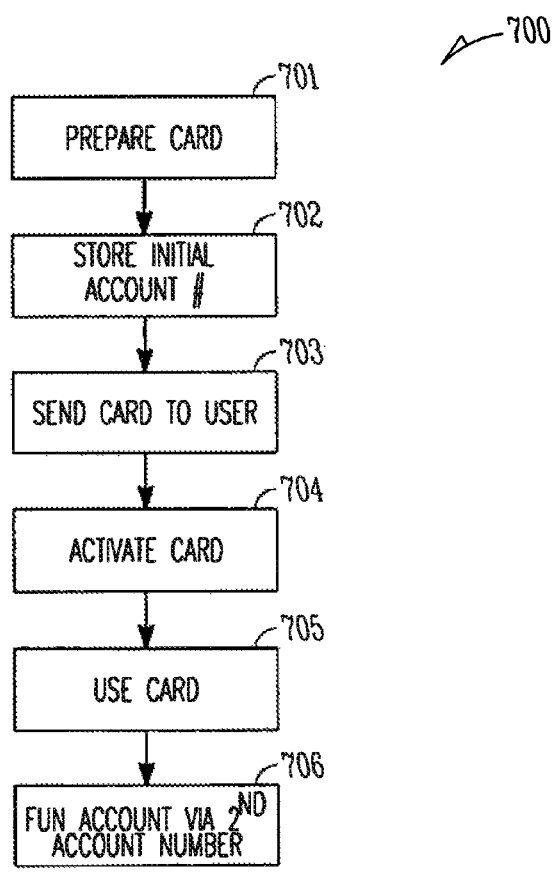
FIG. 7 is a flow chart for the life of a card according to an embodiment.

FIG. 7 shows a flow chart 700 of card usage according to an embodiment. The card is prepared at the financial institution, 701. The card will include a substrate or support on which graphics are provided and a machine readable storage. The card will include an initial account number, 702, but be free of any personal identifying information. Moreover, the first account number will be flagged as being for activation only and will not accept charges or the withdrawal of funds, in an embodiment. In a further embodiment, the initial number is stored on the card in a non-visible manner such that persons in contact with the card will not be able to memorize or otherwise access the initial card number. In an example, the initial number is not embossed or stored on a front side of the card. In an example, the initial number is electo-magnetically stored in an encrypted form. The card is then sent to the user, 703. The card can be mailed, dispensed from an automated machine, or delivered at the financial institution.

Prior to use, the card must be activated, 704. Unlike conventional credit card activation, the present secure card is activated by providing the initial card number to a validator, such as the financial institution, and based on the initial card number the actual account on which the secure card will draw is created. The second account number is created based on the initial card number at the time of activation. The second account number was not stored on the card at creation of the card or its mailing to the user to prevent certain types of fraud and identity theft. In an embodiment, upon creation and writing the second account number to the card, the initial card number is erased. The card is now a bearer instrument and is funded only by and draws from the second account. The card can now be used as a credit card or debit card, 705. Card use will be familiar to the card user. In an embodiment, the card has a relatively low value that a user can afford to lose if the card is stolen or lost. It should be considered the same as cash to a user. As anyone with physical possession of the card or knowledge of the second account number can withdraw funds from the second account. For example, if a user is uncomfortable with the prospect of identity theft but comfortable with losing about $50, then the second account could be funded with $50. A thief could steal the $50 card but would not be able to learn the identity of the user. Accordingly, the user is vulnerable only to the amount on the card and not to the full loss of identity. The user can fund the card by using the second account number by wiping the card in an at-home-automated-banking device, an automated teller machine, or at their financial institution, 706. A further way to fund the card includes using the initial account number and the financial institution will transfer the funds to the second account.

Figure 8:
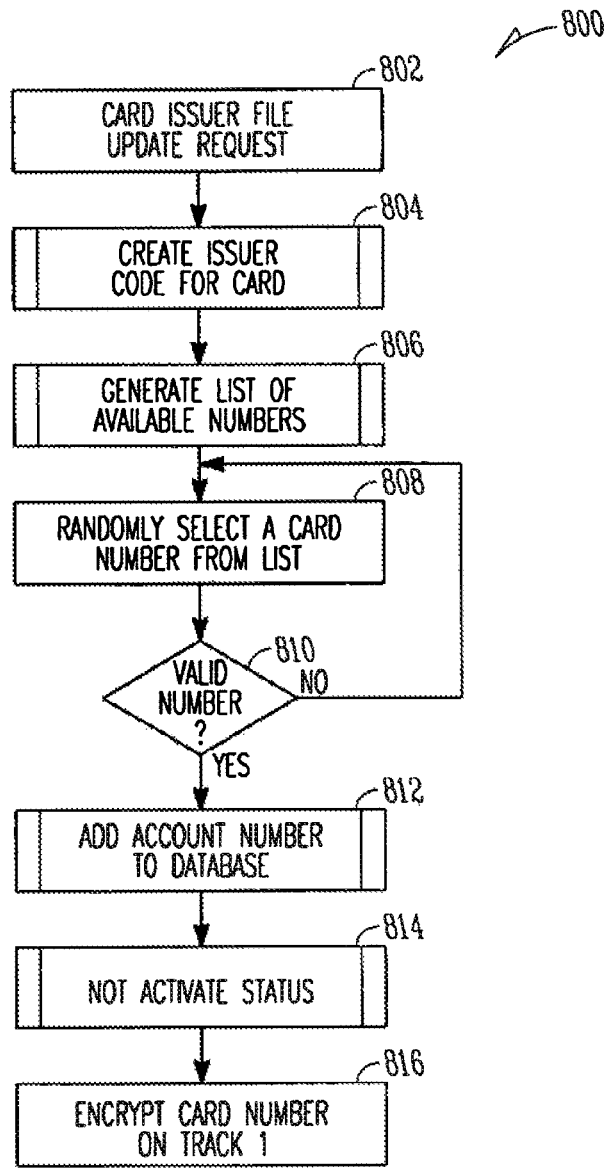
FIG. 8 is a flow chart for creating a card according to an embodiment.

FIG. 8 shows a flow chart 800 of creating a card according to an embodiment. At 802 a card issuer file update request is made. This is a message 302 in the ISO 8583 standard. This will create the initial database record in the issuer's database. An example of an issuing institutions database is described below and shown in FIG. 14. At 804, issuer code for the card is created. Each card for an issuing institution must have an issuer code. At 806, a list of available numbers for the card are created. In an embodiment, the Luhn algorithm is used to create the code. At 808, a card number is selected from the list generated at 806. The number is chosen at random. At 810, a validation determination is made. The validation can include a check of the account balance for a card number, whether the number is in use, whether the expiration date for the card number has passed, and/or a card number validation. If the number is not valid or available, then the procedure returns to randomly select a further number from the list at 808. If the number is valid, then the account number is added to a list of taken numbers in the issuer's database at 812. At 814, a "not active" status is assigned to the number. This will prevent the use of this account number from which funds can be drawn, either as credit or from a funded account. In an embodiment, this status is never changed for this number until the expiration date of the account. At 816, a further security feature is optionally employed. At 816, the card number is encrypted. In an embodiment, the card number is geo-encrypted to limit its geographic scope of use and activation. In an embodiment, other encryption schemes are used.

Figure 9:
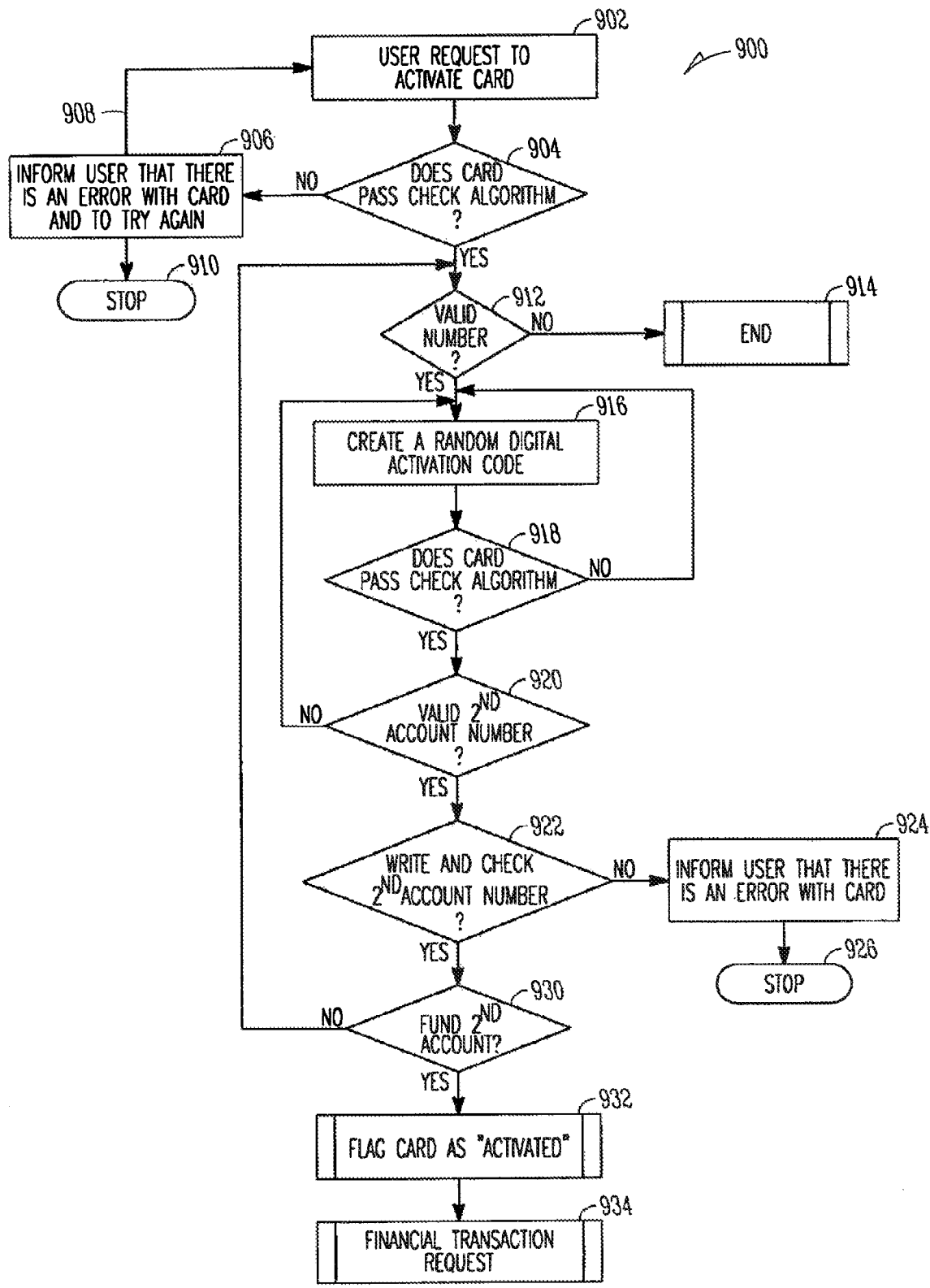
FIG. 9 is a flow chart for activating a card according to an embodiment.

FIG. 9 shows a flow chart 900 of activating a card according to an embodiment. At 902, a card user requests activation of the card. Activation can be done at a point of sale location, an issuing financial institution, an at-home-automated-bank device, or automated teller machine. The card is inserted into a read/write device. The account number stored on the card, for example, the number written to the card in 800 above, is read. At 904, the card number is checked. In an embodiment, a Luhn algorithm check is performed. If the card does not pass the check, the user is informed of the error at 906. The user can try again, 908. In an embodiment, the activation is stopped 910. In an embodiment, the number of errors is counted and after a certain number of errors, i.e., certain number of times the process flows to 906, the activation is automatically stopped. If the card number passes the check at 904, then at 912, a validation determination is made. The validation can include a check of the account balance for a card number, whether the number is in use, whether the expiration date for the card number has passed, and/or a card number validation. If the number is not valid or available, then the procedure ends at 914.

If the first number on the card is valid, then at 916, a second random digital activation code or account number is created. At 918, the card number is checked. In an embodiment, a Luhn algorithm check is performed. If the card does not pass the check, the process returns to 916. If the card's second number passes the check, a further validation of this second account number is performed at 920 informed of the error at 906. At 920, a validation of the second account number is performed. This validation can include a check of the account balance for a second card number, whether the second number is in use, whether the expiration date for the second card number has passed, and/or a second card number validation. In a further embodiment, both the first and second account numbers are validated. If the second number is not valid, then the process returns to 916. If the second number is valid, at 922 is written and checked. In an embodiment, the second number is written to track two of the cards' media storage. In an embodiment, the second number is written and then read. If the read does not match, the write and error message is generated, 924, and the activation is stopped, 926. If the second number matches, then the card is funded, 930 Funding the card includes transferring funds from the first account to the second account in an embodiment. If the card's second account is not funded by the first the process returns to 912 to recheck the first account number. In a further embodiment, the card is funded by depositing funds directly in the second account identified by the second account number. The second account number is not associated with any personal identifying data on the card or in the institution's database. The only identifying data is the first account number in the financial institution's database. If the card's second account is funded, the card is flag is flagged as active in the institution's database for only the second account number at 932. It will be recognized that the account associated with the second account number can be either a cash card account, a debit card account, or a credit account. At 934, further financial transactions can be requested, such as further funds account or spend the funds in the second account.

Figure 10:
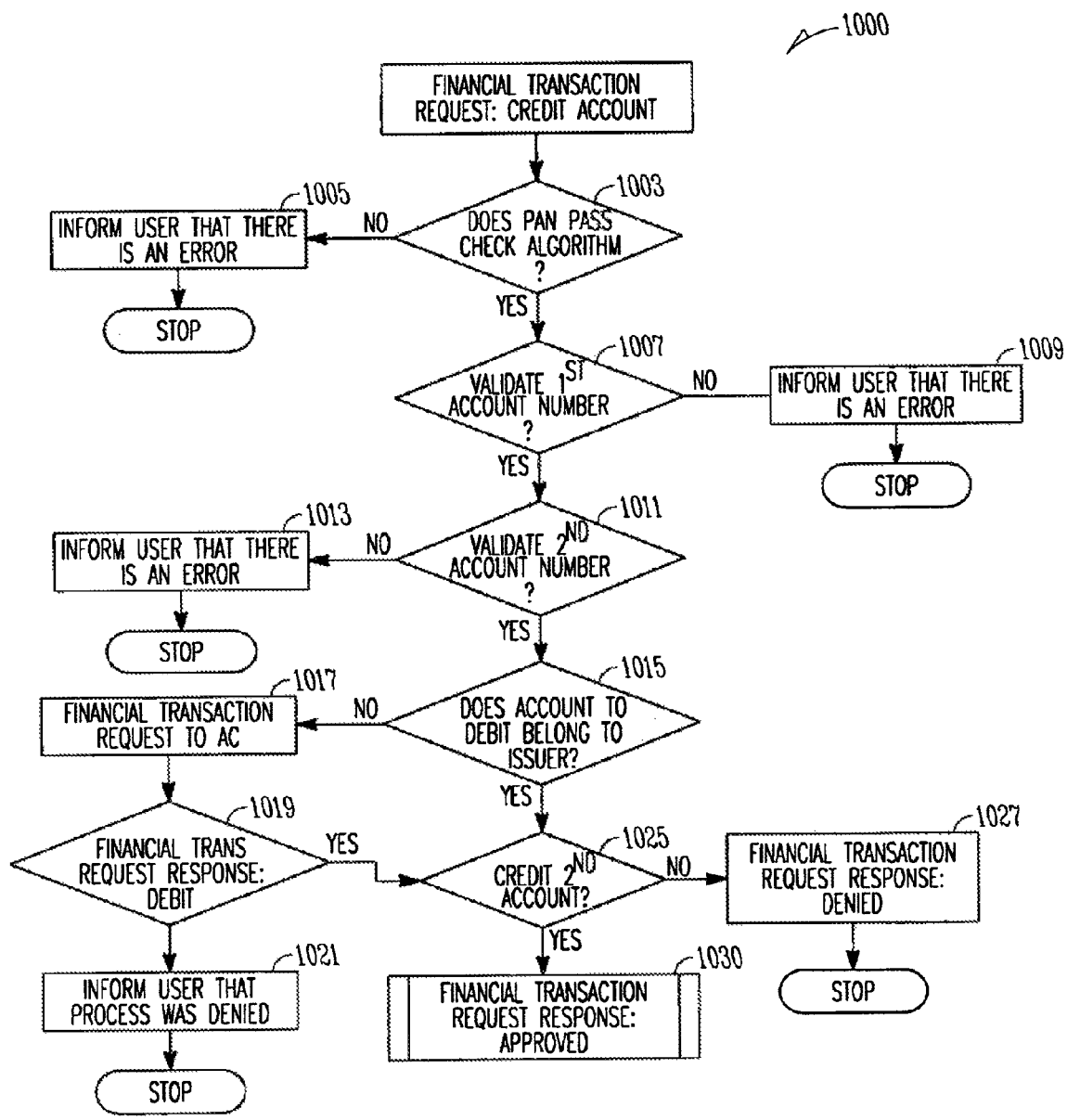
FIG. 10 is a flow chart for adding funds to an account according to an embodiment.

FIG. 10 shows a flow chart 1000 of an adding funds process according to an embodiment. At 1001, a credit account request is made to the financial institution. At 1003, the account number is checked. In an embodiment, the primary account number is checked using the Luhn algorithm. If no, then the user is informed of an error at 1005 and then the process ends. If the account number passes the check, then a number validation is performed at 1007. The validation can include a check of the account balance for a card number, whether the number is in use, whether the expiration date for the card number has passed, and/or a card number validation. If the number is not valid, then the user is informed of an error at 1009 and then the process ends. If the number is valid, then a primary and secondary number check is performed at 1011. If the numbers for the primary account and the secondary account are not valid, then the user is informed of an error at 1013 and then the process ends. If valid at 1011, then a determination is made whether the account to debit, i.e., the source of the funds belongs to the present financial institution at 1015. If no, then at 1017 an electronic financial transaction is send to the institution that holds the account to debit. In an embodiment, the transaction is a code ISO 8583 request. The message is sent through inter-institution terminals. At 1019, a financial transaction request response from the account holding institution is received. If denied, at 1021 inform user that transaction was denied and end. If transaction occurs, then proceed to 1025. If at 1015, the account to be debited belongs to the card holding institution, then proceed to 1025. At 1025, the second account is credited. The second account can be credited through the first account. That is the funds are first transferred to the first account then automatically forwarded to the second account as the only link to the second account is through the first account, in an embodiment. If the funding of the second account fails, then at 1027 an error message is generated and the process ends. If the second account is funded, then at 1030 an approved message is created.

Figure 11:
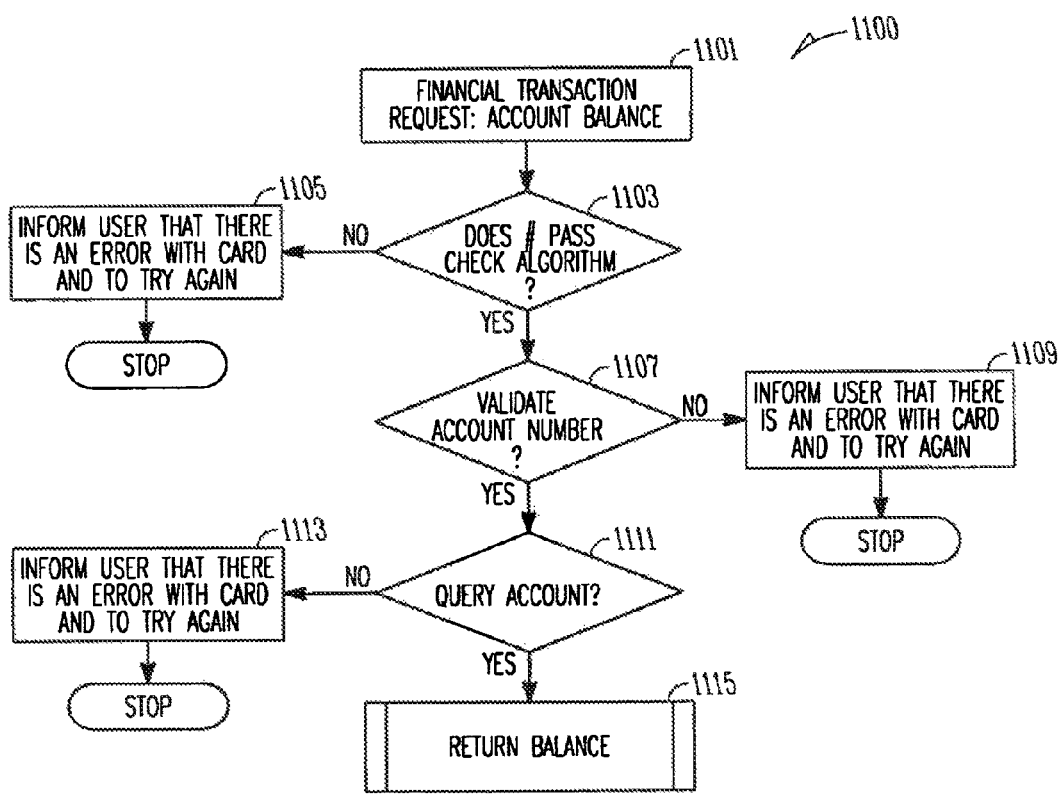
FIG. 11 is a flow chart for checking funds associated with the card according to an embodiment.

FIG. 11 shows a flow chart 1100 of a balance request according to an embodiment. At 1101, a user requests a balance of a card. The user may swipe the card at a card reader and request a balance. This may be done at an at-home or remote banking device, or at an automated teller machine. As the card is a bearer card anyone with knowledge of the account number assigned to the card at activation can request a balance of the card. For example, a parent can check the balance of the account of a child away at school with only the knowledge of the account number. The parent could further fund the card with either the account number or the primary account number. At 1103, a system determines whether the entered account number passes an algorithm check. In an embodiment, the algorithm check is a Luhn's algorithm check. If the card number does no pass, then at 1105 the user is informed of an error with the account number and the balance request is terminated. If the number passes the check, then at 1107 the card account number is validated. The validation can include a check of the account balance for a card number, whether the number is in use, whether the expiration date for the card number has passed, and/or a card number validation. If the number is not valid at 1107, then the user is informed of an error at 1109 and then the process ends. If the number is valid at 1107, then at 1111 the account is queried for the account balance. If there is a fault in the query of the account or if the account is negative, an error message is generated and sent to the user at 1113. If the account is properly queried, then the balance is returned to the user at 1115.

Figure 12:
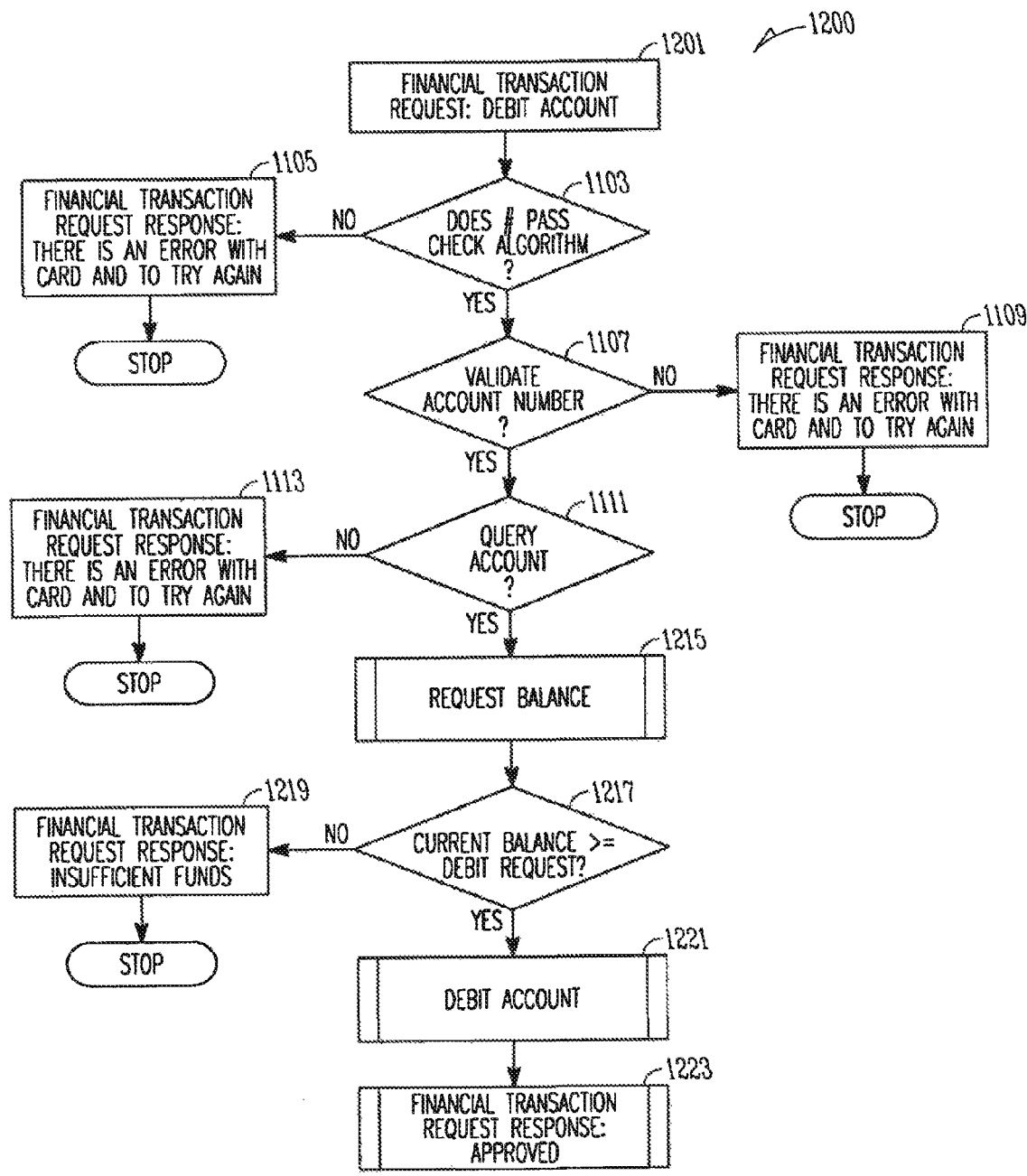
FIG. 12 is a flow chart for using a card according to an embodiment.

FIG. 12 shows a flow chart 1200 of card usage according to an embodiment. Similar steps to the balance query described above with regard to FIG. 11 are identified with the same reference numbers and not described again in detail. At 1201, a debit account request is made using the card in a similar manner as described with balance query as described above, i.e., the following may be performed: an logarithm check 1103, validate account number 1107, query account 1111, etc. At 1215, an account balance is requested. At 1217, a determination is made whether the account contains a balance greater than or equal to the debit request. If no an insufficient funds error message is generated and the process stops at 1219. If there are sufficient funds, then the account is debited at 1221. The account balance is updated and the requested funds are transferred to a designated account. At 1223, a debit transaction approved message is generated to the user and/or to the financial institutions involved.

Figure 13:
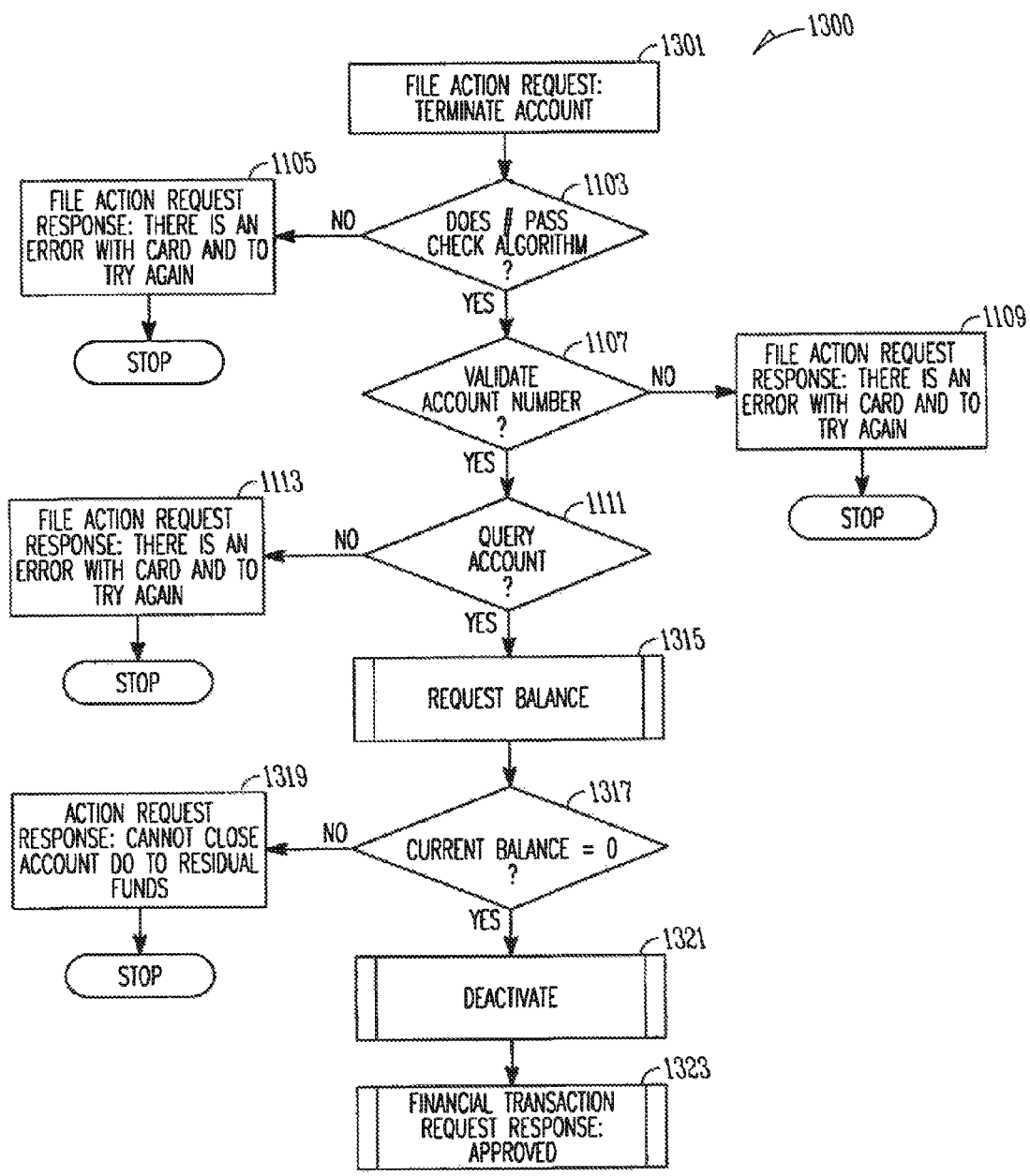
FIG. 13 is a flow chart for terminating a card to an account according to an embodiment.

FIG. 13 shows a flow chart 1300 of card termination according to an embodiment. Similar steps to the balance query described above with regard to FIG. 11 are identified with the same reference numbers and not described again in detail. At 1301, a terminate account request is made using the card in a similar manner as described with balance query/debit account as described above, i.e., the following may be performed: an logarithm check 1103, validate account number 1107, query account 1111, etc. At 1315, an account balance is requested. At 1317, a determination is made whether the account has a zero balance. If no, then the account is not closed and a corresponding message is generated at 1319. If yes, then the account is deactivated and the number is freed for reuse according to the standard at 1321. A message reflecting the deactivation of the account is generated.

When an account is terminated, for example, according to the method of FIG. 13, the account number, which is not visible, and only stored on the card after its activation is erased from the card. The message generated at 1323 can be sent to the card reader/writer and the account number is removed from the card. For example, an all zero number may be written to the card. The card may then be reused. However, upon reactivation, a new account number will be generated. This new account number will be stored on the card and associated with the primary account number or authentication code as described herein.

Figure 14:
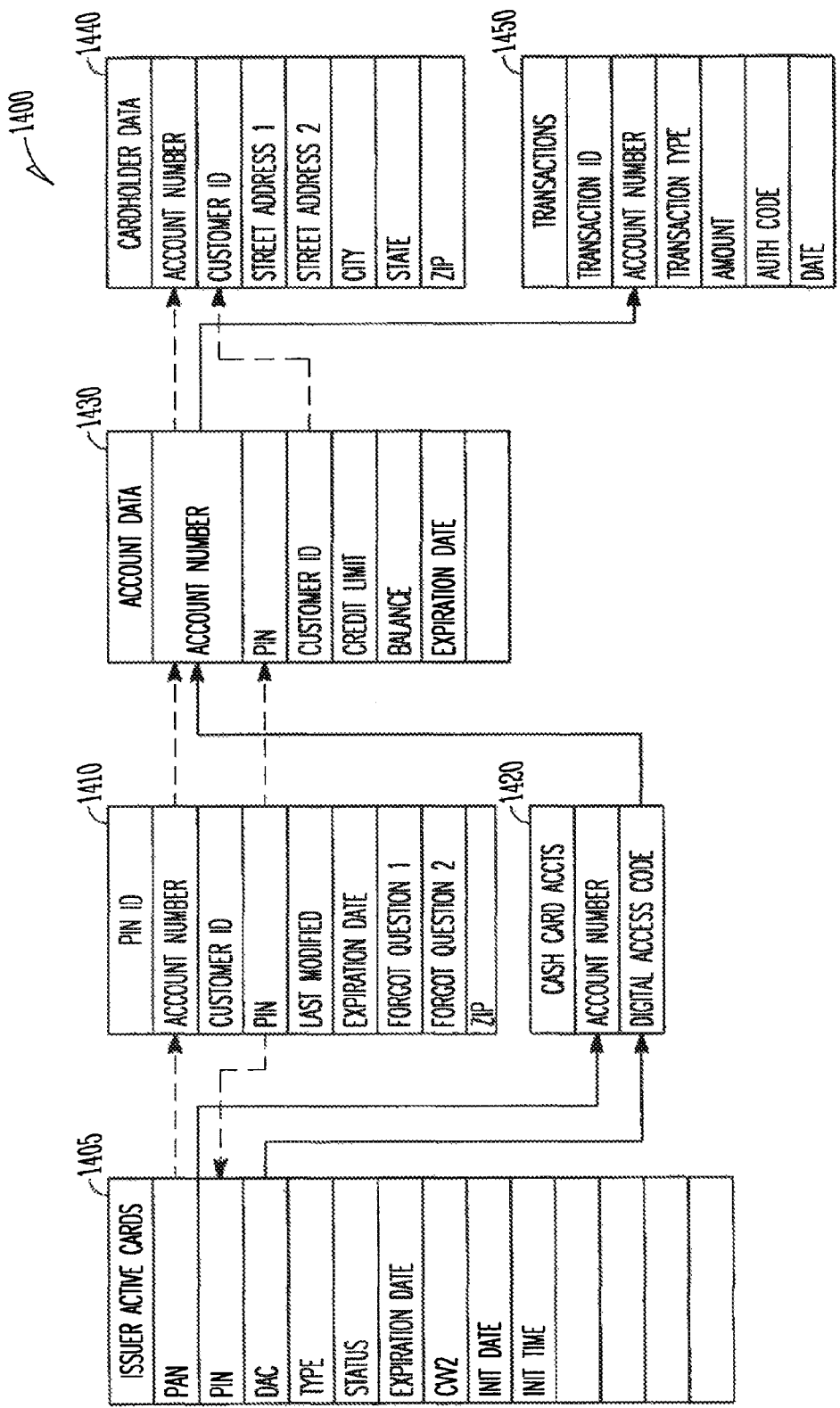
FIG. 14 is a data structure for a card issuer database according to an embodiment.

FIG. 14 shows a card database 1400 according to an embodiment. The database 1400 includes an active card data structure 1410, which includes the first account number (PAN—primary account number), a personal identification number, a second account number (DAC—digital access code, a card type, a card status, am expiration date, a validation code (CVV2—Card Verification Value), an initialization date and initialization time. Other fields and values can be included in the data structure 1405. In an embodiment, the DAC field is pointer to the second account and does not link the any personal information to the second account number.

A personal identification data structure 1410 is lined to the PIN field in structure 1405. The structure 1410 includes the first or primary account number, a customer identifier, e.g., name address, etc., and the personal identification number. Further data with regard to the PIN is stored such as the date of last modification of the PIN, the expiration date of the PIN, a first forgot question, second forgot question, and the account holder's zip code. A cash card account data structure 1420 includes the primary account number and the second account number. In an embodiment only data structure 1420 includes both the account numbers, i.e., data structure 1405 does not contain the second account number. An account data structure 1430 include the primary account number, the personal identification number, a customer identifier, a credit limit, a balance, and an expiration date. A cardholder data structure 1440 includes the account number, a customer identifier, name, and address fields. A transactions data structure 1450 includes a transaction identifier, account number, transaction type, amount authorization code and date. It will be understood that some of the se fields are not required for the primary number as it will not be charged against. However, the balance amount may be used to transfer funds to second account. The personal identifying information in any field will not include the second account number. Moreover, the second account number will not be limited by a PIN, forgot questions or customer identifier that is specifically associated with an individual.

Figure 15:
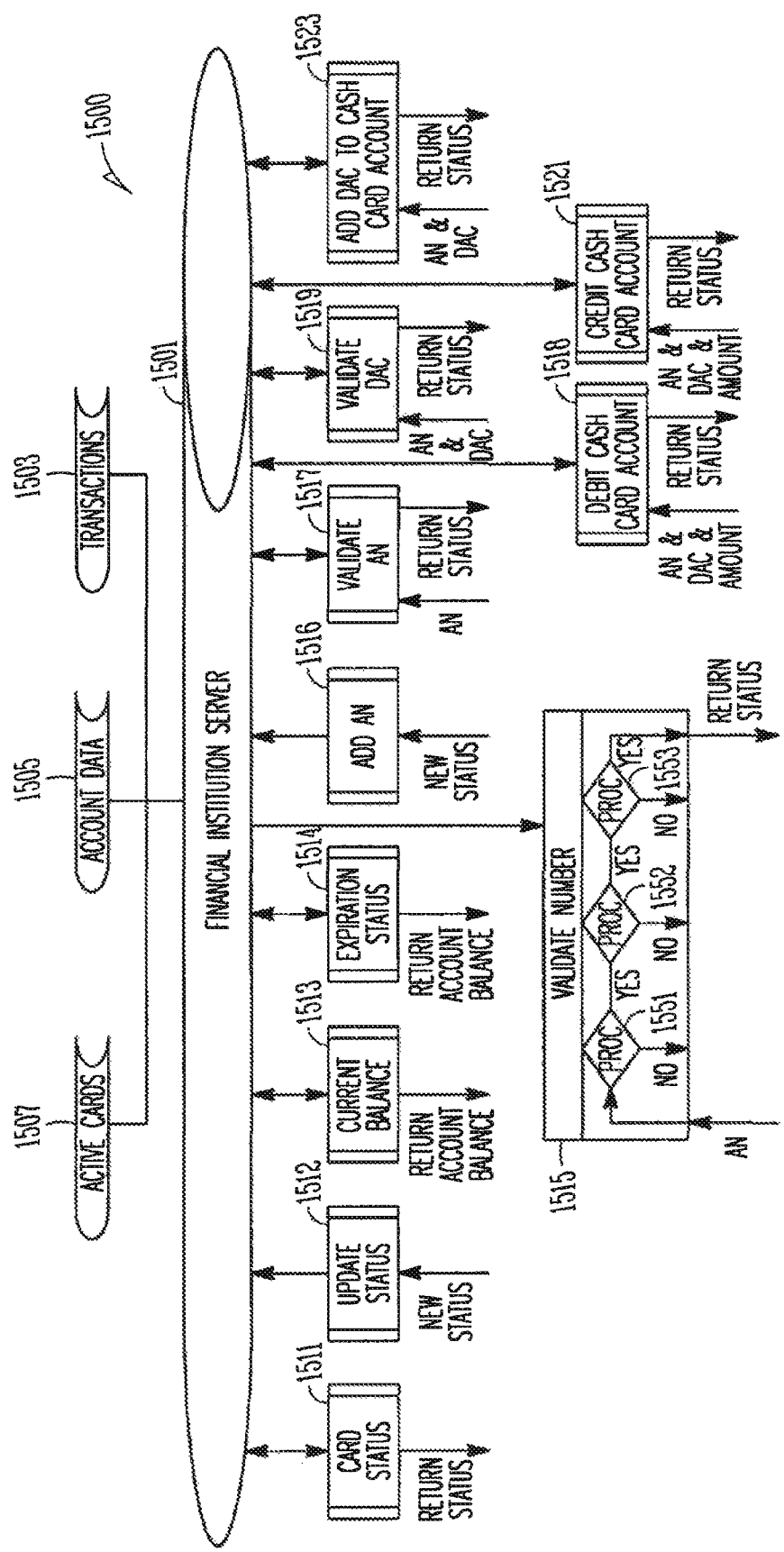
FIG. 15 is a diagram of a system according to an embodiment.

FIG. 15 shows a schematic view of a system 1500 according to an embodiment. A server 1501 or other computer system interacts with various databases, such as a transactions database 1503, account data database 1501, and an active cards database 1507. The communications between the server 1501 and databases 1503, 1505, and 1507 are by standard financial services standards for protection and protocols. The server 1501 further communicates or performs various functions, that are described herein as modules. These modules may be software, hardware or combinations thereof. A card status module 1501 receives a query via the server 1501 as to the status of a particular card. The appropriate databases are accessed and the card status 1511 module outputs the current card status, e.g., active, inactive, invalid, etc. An update status module 1512 receives a new status instructions and updates the appropriate database(s). A current balance module 1513 received a current balance request and outputs the current account balance for a particular card to a requesting device and user. An expiration status module 1514 receives an expiration status request for a particular card and outputs this status.

Module 1515 is to validate an account number. The account number is input an a first validation procedure 1551 is performed. This producer 1551 can include a check of the account balance for a card number, whether the number is in use, whether the expiration date for the card number has passed, and/or a card number validation. If any of these checks are negative, then a negative output is generated. If a positive of OK determination is made, then a second validation procedure 1552 is performed. At the second procedure 1552 a card status query is made. This query can be similar to module 1511. If negative, then a negative output is generated. A third procedure 1553 queries whether the card has expired. The validity status is then output.

Further modules are associated with the server 1501. An add account number module 1516 receives a request to add an account number to the database. The new account number is removed from a list of available account numbers. A validate account number ("AN") module 1517 receives an account number and proceeds to query databases to return to requesting organization or system whether the account number is valid. Debit account module 1518 receives the second account number and possibly the first account number with a debit amount. Module 1518 debits the account and authorizes transfer of funds from the account. Module 1519 validates the second account number. Module 1521 deposits funds into an account using at least one of the first account number or the second account number. Module 1523 links the second account number to the first account number. While the above describe some modules needed for a system to process a secure card as described herein, it is recognized that further modules may be required for efficient processing of secure electronic transactions.

Hardware and Operating Environment

This section provides an overview of example hardware and operating environments, in conjunction with which embodiments of the inventive subject matter can be implemented.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed below regarding FIG. 16.

Figure 16:
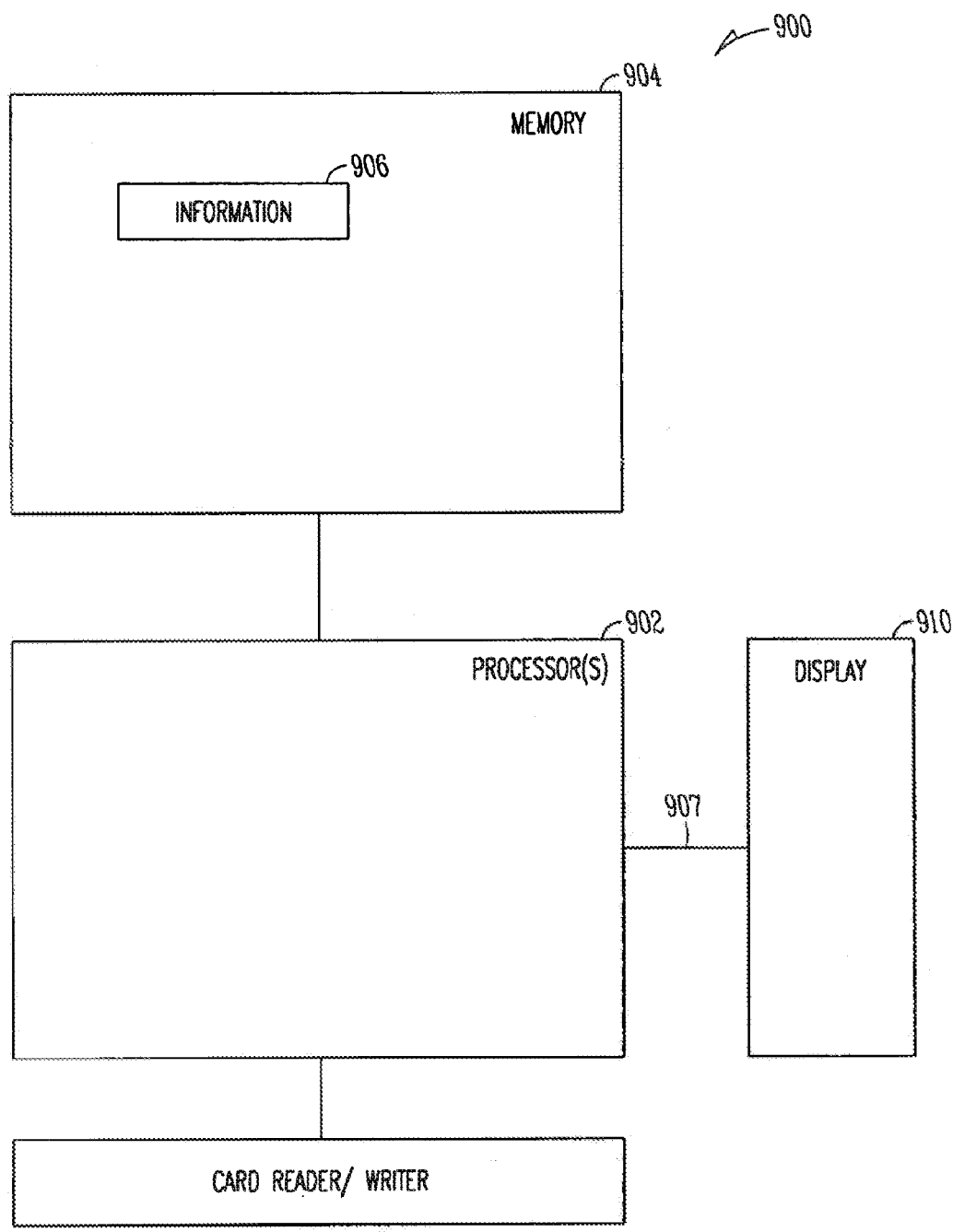
FIG. 16 is a diagram of a system according to an embodiment.

FIG. 16 is a block diagram of an article 1600 according to various embodiments. Such embodiments may comprise a computer, a memory system, a magnetic or optical disk, some other storage device, or any type of electronic device or system. The article 1600 may include one or more processor(s) 1602 coupled to a machine-accessible medium such as a memory 1604 (e.g., a memory including electrical, optical, or electromagnetic elements). The medium may contain associated information 1606 (e.g., computer program instructions, data, or both) which, when accessed, results in a machine (e.g., the processor(s) 1606) performing the activities previously described herein. The processor 1606 communicates over a secure channel to a display 1610. The display 1610 provides the client credit presentment to a user, such an a individual whose credit is displayed to an member representative who is assisting the individual.

Implementing the apparatus, systems, and methods disclosed herein provide real-time calculation of an individual's credit needs. The graphical representations of an individual's financial situation, e.g. available credit, are automatically updated based on new data as it becomes available or when the user access the system. If all of an individual's accounts are with the same financial product provider, then the graphical representation may be updated in real-time using information from the financial product provider's computerized systems. If the individual has some credit accounts that are with other financial product providers, the individual may provide that information so that the graphical representation provides a single view of the individual's credit condition. The apparatus, systems, and methods described herein may be used for all forms of credit determination. As a result the individual through the use of the present system is aware of a single, integrated snapshot of their credit as a whole, including available credit. The available credit is a dynamic, real-time presentment of the lines of credit available to the individual. Moreover, with preapprovals of lines of credit, the system may provide on demand finding or extension of credit to the individual. This may increase the likelihood that the individual will come the system of the financial institution to check credit offers when the need arises or when the individual is in the planning stage that may require a line of credit. The individual need not call during business hours to check his/her available credit as the present system and methods provide a self-service access to information relating to an individual's available line(s) of credit.

This has been a detailed description of some exemplary embodiments of the invention(s) contained within the disclosed subject matter. Such invention(s) may be referred to, individually and/or collectively, herein by the term "invention" merely for convenience and without intending to limit the scope of this application to any single invention or inventive concept if more than one is in fact disclosed. The detailed description refers to the accompanying drawings that form a part hereof and which shows by way of illustration, but not of limitation, some specific embodiments of the invention, including a preferred embodiment. These embodiments are described in sufficient detail to enable those of ordinary skill in the art to understand and implement the inventive subject matter. Other embodiments may be utilized and changes may be made without departing from the scope of the inventive subject matter. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is also understood that while some embodiments described above limit the secure card as a cash withdrawal vehicle that draws funds that are previously deposited in that account via a first account number then transfer by a financial institution to a second account that has no personal identifiable data, the second account can include a line of credit. This will allow the second account number to act as a credit card, however, absent personal identification safeguards and drawbacks. That is, the bearer of the card can draw on the credit but need not provide their personal identification to authenticate who they are when using the card.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

It is emphasized that the Abstract is provided to comply with 36 C.F.R. §1.62(b) requiring an Abstract that will allow the reader to quickly ascertain the nature and gist of the technical disclosure. It is submitted with the understanding that it will not be used to interpret or limit the scope or meaning of the claims.

I claim:

1. A secure financial card, comprising:
    a substrate;
    an activation number stored in a machine-readable manner on the substrate,
        wherein the activation number is used to activate the secure financial card,
        wherein the activation number is erased upon activation of the secure financial card; and
    an account number stored in a machine-readable and non-visible manner on the substrate,
        wherein the account number is generated and stored upon activation of the secure financial card.

2. The secure financial card of claim 1, wherein the substrate is free from personally identifiable data.

3. The secure financial card of claim 1, wherein the activation number is stored in a non-visible manner on the substrate.

4. The secure financial card of claim 1, wherein the account number is geo-encrypted to limit use of the secure financial card to a specified geographic area.

5. The secure financial card of claim 1, wherein the account number is generated based on the activation number at the time of activation.

6. The secure financial card of claim 1, wherein the substrate is free from embossment that is offset from a portion of a surface of the substrate.

7. The secure financial card of claim 1, wherein the substrate includes a magnetic data storage to store the activation number and the account number.

8. The secure financial card of claim 1, wherein the activation number is a first account number.

9. The secure financial card of claim 8, wherein upon activation, funds are transferred from a first account associated with the first account number to a second account associated with the account number.

10. A computerized method of generating a secure financial card, comprising:
    storing, by a computer system of a financial institution, the computer system having a processor, an activation number in a machine-readable manner on a card;
        wherein the activation number is used to activate the secure financial card,
        wherein the activation number is erased upon activation of the secure financial card;
    activating, by the computer system, the card, comprising:
        generating, by the processor, an account number based on the activation number, and
        storing, by the processor, the account number in a non-visible manner on the card; and
    funding the card.

11. The method of claim 10, wherein the card is free from personally identifiable data.

12. The method of claim 10, wherein the activation number is stored in a non-visible manner on the card.

13. The method of claim 10, wherein the account number is geo-encrypted to limit use of the card to a specified geographic area.

14. The method of claim 10, wherein the card is free from embossment that is offset from a portion of a surface of the substrate.

15. The method of claim 10, wherein the card includes a magnetic data storage to store the activation number and the account number.

16. The method of claim 10, wherein the activation number is a first account number.

17. The method of claim 16, further comprising:
    transferring funds from a first account associated with the first account number to a second account associated with the account number upon activation of the card.

18. A system for generating a secure financial card, comprising:
    means for storing an activation number in a machine-readable manner on a card;
        wherein the activation number is used to activate the secure financial card,
        wherein the activation number is erased upon activation of the secure financial card;
    means for generating an account number based on the activation number;
    means for storing the account number in a non-visible manner on the card; and
    means for funding the card.

19. The system of claim 18, wherein the card is free from personally identifiable data.

20. The system of claim 18, wherein the activation number is stored in a non-visible manner on the card.

* * * * *